United States Patent [19]

Patzelt

[11] Patent Number: 4,942,754
[45] Date of Patent: Jul. 24, 1990

[54] ARRANGEMENT FOR AXIALLY DISPLACING ROLLS IN ROLLING MILL STANDS

[75] Inventor: Ulrich Patzelt, Kreuztal, Fed. Rep. of Germany

[73] Assignee: SMS Schloemann-Siemag Aktiengesellschaft

[21] Appl. No.: 195,210

[22] Filed: May 18, 1988

[30] Foreign Application Priority Data

May 20, 1987 [DE] Fed. Rep. of Germany ....... 3716901

[51] Int. Cl.$^5$ ......................................... B21B 31/18
[52] U.S. Cl. ..................... 72/247; 72/237; 285/276; 285/317; 403/316; 403/324
[58] Field of Search ............... 72/247, 324, 326, 237; 285/18, 276, 317; 403/14, 324, 316, 331, 355

[56] References Cited

U.S. PATENT DOCUMENTS

| | | | |
|---|---|---|---|
| 4,185,935 | 1/1980 | Bierlein | 403/14 |
| 4,191,042 | 3/1980 | Salten, Jr. | 72/247 |

FOREIGN PATENT DOCUMENTS

| | | |
|---|---|---|
| 1031250 | 6/1958 | Fed. Rep. of Germany . |
| 3504415 | 8/1986 | Fed. Rep. of Germany . |
| 3521180 | 12/1986 | Fed. Rep. of Germany . |
| 667782 | 3/1952 | United Kingdom . |
| 734996 | 8/1955 | United Kingdom . |
| 1228044 | 4/1971 | United Kingdom . |

Primary Examiner—W. Donald Bray
Attorney, Agent, or Firm—Toren, McGeady & Associates

[57] ABSTRACT

An arrangement for axially displacing rolls in rolling mill stands. The rolls of the rolling mill stands are supported in roll supports or chocks which are adjustably and slidably guided in the roll housings of the stand. The rolls are displaceable by means of hydraulic piston-cylinder units which are supported relative to the roll housing and are connected to the supports of the bearings of the roll. The bearings of the rolls are axially slidable within the roll supports and a sliding guide is arranged on the roll support for a sliding carriage which supports a coupling device for a roll neck. The hydraulic piston-cylinder units are articulated to the sliding carriage. The coupling device includes drive members which are slidable in radial guides and can be placed in an annular groove of the roll neck. The coupling device is supported by the neck bushing of the deep-groove-type radial roller bearing which is immovably arranged in the sliding carriage. The drive members include skirt-type pistons which are guided in radially extending guide bores within the neck bushing. The pistons are biased by means of a spring in the direction toward the roll neck and are biased toward the opposite direction by means of a pressure medium.

3 Claims, 2 Drawing Sheets

ARRANGEMENT FOR AXIALLY DISPLACING ROLLS IN ROLLING MILL STANDS

BACKGROUND OF THE INVENTION

1. Field of the Invention

The present invention relates to an arrangement for axially displacing rolls in rolling mill stands. The rolls of the rolling mill stand are supported in roll supports or chocks which are adjustably and slidably guided in the roll housings of the stand. The rolls are displaceable by means of hydraulic piston-cylinder units which are supported relative to the roll housing and are connected to the supports of the bearings of the rolls. The bearings of the rolls are axially slidable within the roll supports and a sliding guide is arranged on the roll support for a sliding carriage which supports a coupling device for the roll neck. The hydraulic piston-cylinder units are articulated to the sliding carriage. The coupling device includes drive members which are slidable in radial guides and can be placed in an annular groove of the roll neck. The coupling device is supported by the neck bushing of a deep-groove-type radial roller bearing which is immovably arranged in the sliding carriage.

2. Description of the Prior Art

Arrangements of the above-described type are known, for example, from German Offenlegungsschrift 35 21 180. In cluster row stands including work rolls, intermediate rolls and back-up rolls, these arrangements serve to axially displace by a given distance the intermediate rolls and/or the work rolls. In the embodiment of the arrangement described above, the coupling device is arranged on the end face of the neck bushing of the deep-groove-type of the radial roller bearing which faces away from the roll neck. The coupling device includes a support member which is connected to the neck bushing and has coupling members as drive members which are placeable in an annular groove of the roll neck. The coupling device further includes a sliding sleeve which is axially slidable over the support member and which effects a radial displacement or pivoting of the drive members. The drive members are constructed as drive blocks with central recesses which are displaceable in radial guide grooves of the support member. The first ends of double levers mounted in the support member engage in these central recesses and the second ends of the double levers rest against inwardly facing guide tracks of the sliding sleeve. A load can be applied to the drive blocks by clamping guides of the sliding sleeves which extend inwardly and narrow conically.

The known arrangement has the disadvantage that the structural length in axial direction is great because it is arranged outside of the deep-groove-type radial roller bearing at the end face thereof and, thus, the neck bushing is subjected to a bending load. In addition, the arrangement is structurally complicated because of the numerous slotted guides which require chip-removing work. Also, due to the length of the roll neck and the masses which rotate outside of the deep-groove-type radial roller bearing, harmful vibrations occur because the imbalances within the construction cannot be entirely eliminated.

It is, therefore, the primary object of the present invention to provide an arrangement for the axial displacement of rolls in rolling mill stands in which the above-described disadvantages and difficulties are avoided.

SUMMARY OF THE INVENTION

In accordance with the present invention, the drive members include skirt-type pistons which are guided in radially extending guide bores within the neck bushing, wherein the skirt-type pistons are biased by means of a spring in the direction toward the roll neck and are biased in the opposite direction by means of a pressure medium.

In accordance with an advantageous feature of the present invention, the skirt-type pistons may be collar-type pistons which are offset at the end face facing away from the roll neck, wherein the collar of the collar-type piston is biased by means of the pressure medium.

In accordance with a further feature of the present invention, a safety bolt is provided for axially fixing the skirt-type pistons in the coupling position. The safety bolt is slidably guided in a bore in the neck bushing extending parallel to the axis of rotation and can be inserted tangentially into the path of movement of a skirt-type piston. The safety bolt has a lateral recess for the skirt-type piston.

The arrangement according to the present invention eliminates the above-mentioned disadvantages and difficulties of known arrangements. In addition, the arrangement according to the present invention has relatively small masses which rotate essentially without imbalances. The components required for the coupling are essentially rotating components. Also, the structural space requirements are within the dimensions of the already present deep-groove-type radial roller bearing.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
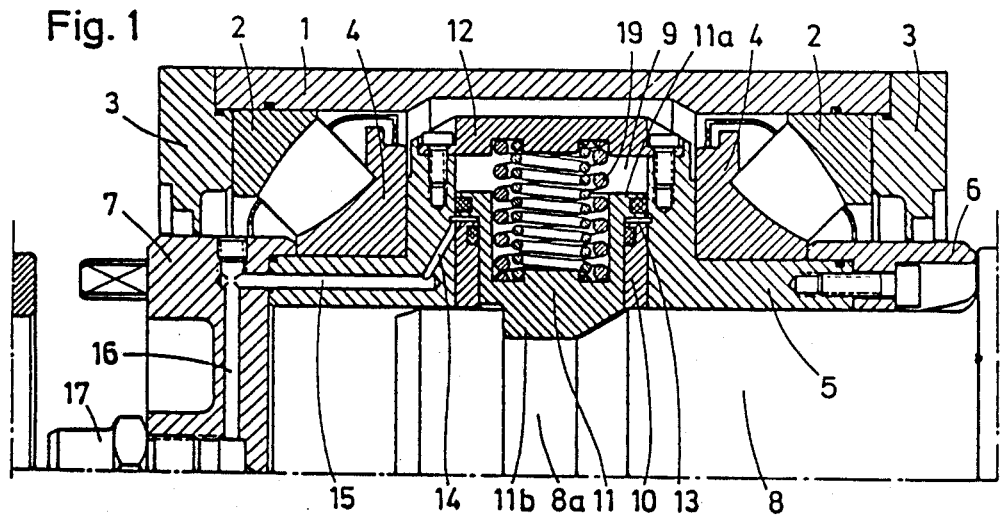
FIG. 1 is a partial sectional view taken in axial direction of the arrangement according to the present invention.

As illustrated in FIG. 1 of the drawing, a sleeve 1 receives the outer rings 2 of the deep-groove-type radial roller bearing. Sleeve 1 with flange rings 3 is non-slidably mounted, in a manner not illustrated, in a sliding carriage which is also not illustrated. The sliding carriage is movable in axial direction by means of piston-cylinder units. The inner rings 4 of the deep-groove-type radial roller bearing are supported by a neck bushing 5 which is placed on roll neck 8. The inner rings 4 are fixed on the bushing 5 by means of a screwed-on flange ring 6 and a cover disk 7.

Figure 6:
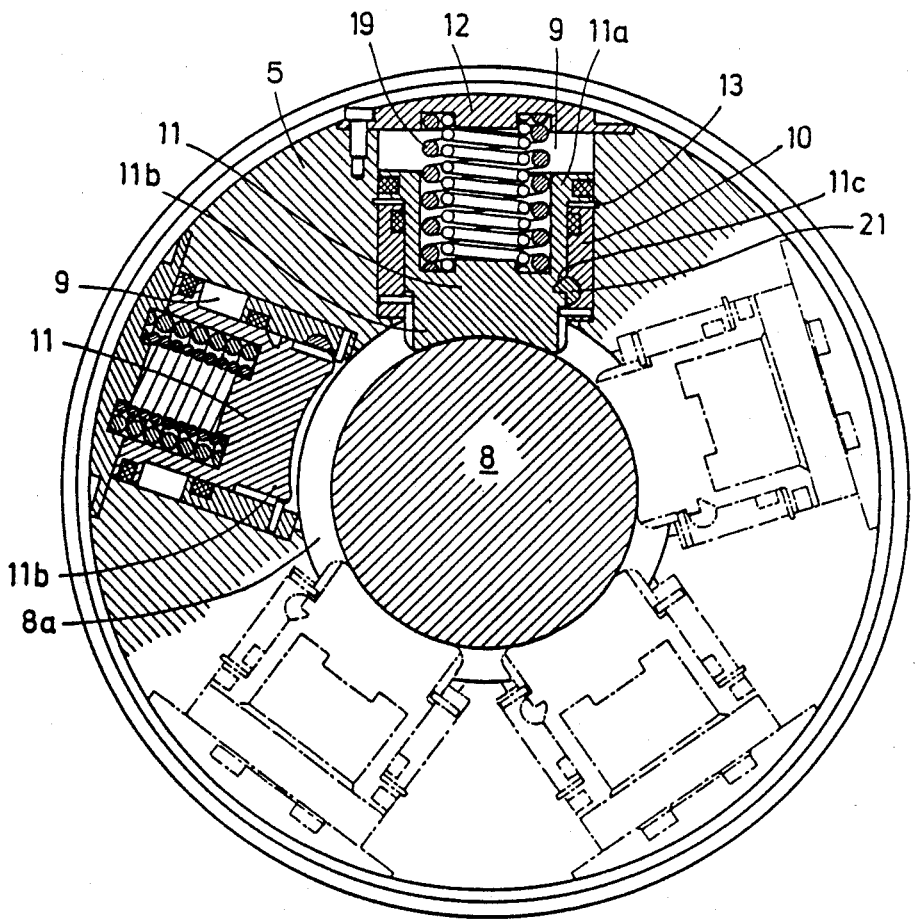
FIG. 6 is a partial view, taken in radial direction, of the arrangement shown in FIG. 1.

As can also be seen in FIG. 6, the neck bushing 5 has radially extending guide bores 9. Cylinder bushings 10 which serve to guide the skirt-type piston 11 are placed in guide bores 9. On the side facing away from the roll neck 8, the guide bores 9 are closed by a screw cover 12. An annular space 13 is formed between the radially inwardly facing annular surface of the collar 11a of the skirt-type piston and the annular end face of the cylinder bushing 10 facing the annular surface of the collar 11a. The annular space 13 is connected through line bores 14, 15 and 16 to a pressurized liquid coupling 17. A pressure medium plug 18, shown in dash-dot lines in FIG. 2, can be placed on the coupling 17. Compression springs 19, also shown in FIG. 6, are arranged between the screw cover 12 and the skirt-type piston 11.

Figure 2:
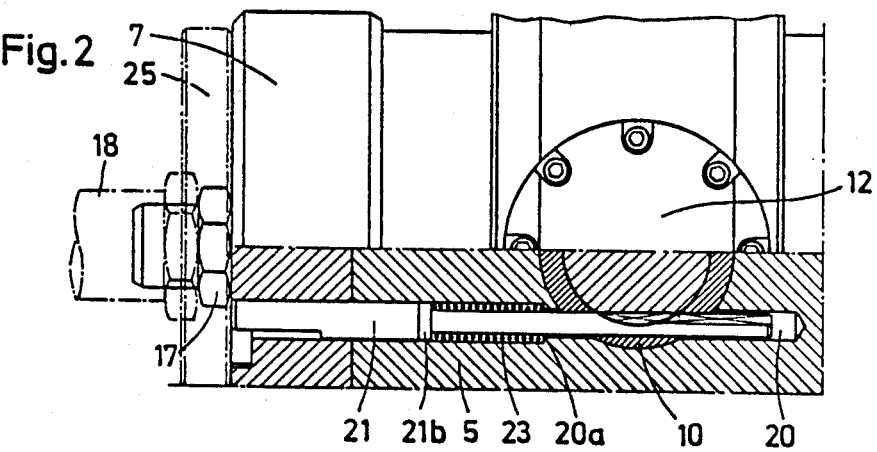
FIG. 2 is a top view, partially in section, of a portion of the arrangement of FIG. 1.
Figure 3:
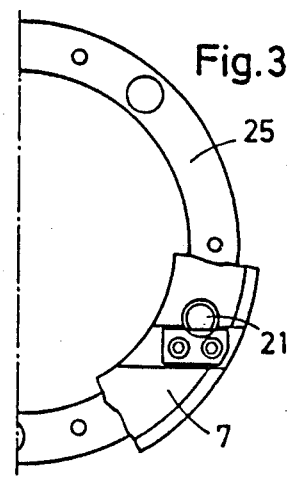
FIG. 3 is a partial view of a portion of the arrangement shown in FIG. 2.
Figure 4:
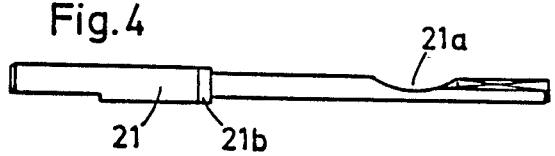
FIGS. 4 and 5 show details of the arrangement shown in FIGS. 2 and 3.

As illustrated in FIGS. 2 and 3, an offset bore 20 is provided in neck bushing 5. An also offset safety bolt 21 is longitudinally movably guided in the bore 20. The bore 20 intersects tangentially the inner cylindrical space of the cylinder bushing 10, wherein the safety bolt 21 has a recess 21a which corresponds to the cut-out circular portion resulting from the intersection of bore 20 with the inner cylindrical space of the cylinder bushing 10. A spring 23 acts on an annular recess 21b of the safety bolt 21 and rests against a corresponding annular recess 20a of the bore 20.

Figure 5:
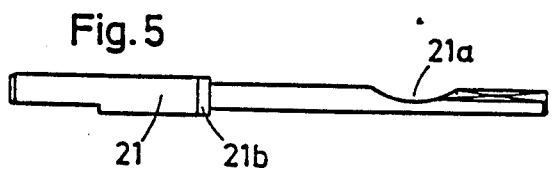

In the operating position illustrated in FIGS. 1 and 6 in solid and dash-dot lines, the skirt-type piston 11 is under the pressure of springs 19 and engages with a drive member projection 11b in an annular groove 8a of the roll neck 8 because the annular space 13 between the collar 11a of the skirt-type piston 11 and the cylinder sleeve 10 does not contain pressure medium. The skirt-type piston 11 is locked in this position and is secured against the effect of centrifugal forces occurring during roll operation by means of the safety bolt 21 which assumes the axial position illustrated in FIGS. 1 and 5 and engages a corresponding recess 11c of the skirt-type piston 11. This position of the safety bolt 21 is made visible to the outside by its end 21b which axially projects from the cover disk 7.

When the skirt-type pistons 11 are to be disengaged, a ring 25 with the pressure medium plug 18 is placed on the screw cover 7, as can be seen in FIG. 2. In FIG. 2, a ring 25 and plug 18 are shown in dash-dot lines. As a result, pressure medium is admitted through bores 16, 15, 14 into the annular space 13 and the skirt-type piston 11 assumes the position illustrated in the top left portion of FIG. 6. In this position, the projection 11b of the skirt-type piston 11 is located outside of the annular groove 8a of the roll neck 8. Also, the safety bolt 21 is pushed into the position illustrated in FIG. 2 in which the recess 21a is within the cylinder bushing 10 and, thus, releases the path of movement of the skirt-type piston 11. The neck bushing 5 and the roll neck 8 can now be slid off each other and separated for carrying out a roll change.

While a specific embodiment of the invention has been shown and described in detail to illustrate the application of the inventive principles, it will be understood that the invention may be embodied otherwise without departing from such principles.

I claim:

1. In an arrangement for axially displacing rolls in rolling mill stands, wherein the rolls of the rolling mill stand are supported in rolls supports including bearings which are axially slidable within the roll supports, the supports being adjustably and slidably guided in roll housings of the stand, the rolls being displaceable by means of hydraulic piston-cylinder units which are supported relative to the roll housings and are connected to the supports of the bearings of the rolls, a sliding guide being arranged on the roll support for a sliding carriage which supports a coupling device for a roll neck, the roll neck having an annular groove, the hydraulic piston-cylinder units being articulated to the sliding carriage, the coupling device including drive members which are slidable in radial guides and can be placed in the annular groove of the roll neck, the coupling device being supported by a neck bushing of a deep-groove-type radial roller bearing which is immovably arranged in the sliding carriage, the neck bushing having radially extending guide bores, the improvement comprising the drive members including skirt-type pistons, means for guiding the skirt-type pistons in the radially extending guide bores within the neck bushing, spring means for biasing the skirt-type piston in a direction toward the roll neck and pressure medium means for biasing the skirt-type pistons in the opposite direction.

2. The arrangement according to claim 1, wherein skirt-type pistons are collar-type pistons which are offset at an end face thereof facing away from the roll neck, the arrangement comprising means for biasing the collar of the collar-type piston by the pressure medium.

3. The arrangement according to claim 1, comprising a safety bolt for fixing one of the skirt-type pistons in the coupling position, means for slidingly guiding the safety bolt in a bore in the neck bushing extending parallel to the axis of rotation and means for inserting the safety bolt tangentially into the path of movement of the skirt-type piston, wherein the safety bolt has a lateral recess for permitting passage of the skirt-type piston.

* * * * *